United States Patent [19]
Iwafune et al.

[11] 3,838,927
[45] Oct. 1, 1974

[54] METERING DEVICE USING A PENDULUM FOR DETERMINING GRAVITATIONAL REFERENCE DIRECTION

[75] Inventors: Yasuo Iwafune; Kazuo Kimura, both of Tokyo; Teruo Murota, Ohmiya; Hiroshi Nishikatsu, Tokyo, all of Japan

[73] Assignee: Tokyo Kogaku Kikai K.K., Tokyo, Japan

[22] Filed: Mar. 5, 1973

[21] Appl. No.: 338,320

[30] Foreign Application Priority Data
Mar. 9, 1972 Japan............................. 47-24246
Apr. 7, 1972 Japan............................. 47-34460
Apr. 11, 1972 Japan............................. 47-35676

[52] U.S. Cl................................. 356/250, 33/73 D
[51] Int. Cl............................................... G01c 9/12
[58] Field of Search.... 356/247, 248, 250, 253–255, 356/148, 149; 33/73 D

[56] References Cited
UNITED STATES PATENTS
2,938,422 5/1960 Hardy..................... 356/250
3,058,396 10/1962 Tsubokawa................ 356/250
3,220,297 11/1965 Baker et al. ............... 356/250

*Primary Examiner*—William L. Sikes
*Attorney, Agent, or Firm*—Silverman & Cass

[57] ABSTRACT

A vertical-indicating pendulum for use in a metering device with reference to gravitational reference direction, comprising a mass suspended from a support by a flexible suspender and an arm which is stationary relative to the support and engages the suspender at an intermediate point between the support and mass while causing the suspender to bear the entire weight of the mass, whereby the period of the natural vibration of the pendulum is reduced.

10 Claims, 16 Drawing Figures

PATENTED OCT 1 1974 3,838,927

FIG_1A

FIG_1B

FIG_2

FIG_3A

FIG_3B

FIG_4A

FIG_4B

FIG_5A

FIG_5B

FIG_6

FIG_7

FIG_8

FIG_9

FIG_10

FIG_11

FIG_12

METERING DEVICE USING A PENDULUM FOR DETERMINING GRAVITATIONAL REFERENCE DIRECTION

BACKGROUND OF THE INVENTION:

1. Field of the Invention

This invention relates to a metering device using a pendulum for determining a gravitational reference direction, and more particularly to a pendulum means which is usable in a metering device for determining the vertical direction as a reference direction. An example of a metering device of the same type as that of the invention is a level indicating device, an electric level indicating device, a clinometer, or a theodolite, which includes a level compensator using a pendulum.

2. Description of the Prior Art:

In a pendulum-type level indicating device, a pendulum consisting of an optical element, e.g., a prism or reflector, or a member carrying such an optical element, is suspended from a support member, so as to determine a horizontal direction based on the gravitational direction. In an automatic level indicating device, the pendulum having an optical element is suspended in such a manner that, even when the automatic level indicating device is placed at an inclined relation to a true horizontal direction, such inclination relative to the horizontal direction is compensated for, so as to define true horizontal direction despite the inclination.

Several types of automatic level indicating devices are known. For instance, a pendulum is swingably suspended in the level indicating device by a pair of flexible strings made of synthetic resin tapes, or a rigid suspending member having a pendulum secured to the lower end thereof is suspended by a ball bearing, or a pendulum is suspended by four resilient filaments. Such known automatic level indicating devices are disclosed in "JANAER JAHRBUCH, 1958, 1 Teil" Published by VEB Carl Zeiss JENA.

To facilitate fabrication and operation of such metering device, it is necessary to allow a pendulum to swing over a certain range. In this case, repeated swinging of the pendulum tends to cause fatigue in a suspending means, for instance, application of repeated strain to suspending means consisting of plastics tapes may cause fatigue fracture. To avoid the fatigue, if the plastics tapes are made thin, creep will be caused. Thus, the internal stress of the suspending means at the time of the maximum deformation thereof should be restricted to be less than a predetermined safety limit, i.e., in the elastic region thereof. If the apparent maximum deformation of the pendulum suspending means is represented by $\lambda$ and the effective length of the suspending means at no load is represented by $l$, the stress $\epsilon$ is given by the following equation.

$$\epsilon = \lambda/l \quad (1)$$

Accordingly, when an allowable maximum stress corresponding to the safety limit and the maximum displacement of the pendulum are determined, the effective length of the suspending means will be selected based on the equation (1). Thus, if the tape-like suspending means is made of a strong material, it is susceptible to fatigue fracture when repeated stress is applied thereto. On the other hand, if the suspending means is made of thin materials for avoiding the fatigue fracture, it tends to creep. Furthermore, the absolute value of the elongation of the suspending means should be greater than a certain minimum value, because to achieve a very small elongation a short suspending means is necessary, and when the suspending means is too short, it is easily susceptible to breakdown by excessive elongation per unit length thereof. On the other hand, when the suspending means is too long, it will have a high strength against elongation but it will require much space and the device using such suspending means will become bulky. Thus, excessively long suspending means is not practical.

Thus, with a conventional pendulum for a level device, the flexible suspending means of the pendulum must have a length between a certain minimum value and a certain maximum value. The conventional pendulum with such flexible suspending means has a natural frequency of vibration which often falls in a range disturbing efficient determination of a vertical or horizontal. More particularly, when the pendulum has a natural frequency of 3 Hz to 8 Hz, such pendulum is apt to easily resonate with an outside oscillation, so that if a mirror is attached to such pendulum, the viewing field of the mirror becomes unstable.

If one tries to damp such resonance solely by a damper, such as a pneumatic, hydraulic, or electromagnetic damper, it will result in a long stabilizing time, i.e., the pendulum tends to take a long time before being stabilized at a balanced position. The long stabilizing time is, of course, undesirable, because it hampers speedy determination of a horizontal or a vertical.

Therefore, an object of the present invention is to mitigate the aforesaid difficulties of conventional metering device using a pendulum for determining gravitational reference direction, by providing an improved pendulum means for such metering device.

SUMMARY OF THE INVENTION

According to the present invention, there is provided a metering device using a pendulum for determining gravitational reference direction, comprising a casing of the metering device, a pendulum mass carrying a vertical-indicating element, a flexible hanging means having an upper end thereof secured to said casing and a lower end thereof secured to said pendulum mass, the flexible hanging means being long enough to limit internal stress thereof, which is caused by said pendulum mass during operation, within elastic region of the hanging means, and an arm secured to the casing in such a manner that said arm comes in contact with said flexible hanging means at an intermediate point between said upper end and said lower end of the hanging means without causing any permanent deformation of the hanging means, so as to cause said intermediate point to act as an intermediate holding point about which the pendulum mass swings.

Thus, with the present invention, the natural frequency of the pendulum is modified by the arm so as to deviate from the aforesaid undesirable 3 Hz to 8 Hz, while maintaining the internal stress of the hanging means within elastic region thereof. For instance, the natural frequency of a pendulum is modified from about 3–8 Hz without the arm to about 20 Hz by the addition of the arm defining the intermediate holding point. Such modification of the natural frequency of the pendulum is achieved by shifting the holding point of the pendulum, about which the pendulum swings, from the upper end of the flexible hanging means to the aforesaid intermediate point without increasing the internal stress thereof.

When a pendulum which has a comparatively high natural frequency, for instance, 20 Hz or higher, swings at such natural frequency, human eyes cannot discern such swinging due to the afterimage effect of the human eyes. Thus, such swinging becomes harmless.

According to the present invention, it is also possible to modify the position of the center of gravity of a pendulum of the aforesaid construction, by adding a balancing mass to the pendulum at a position above the aforesaid intermediate position. By controlling the position of the center of gravity of a pendulum, the swinging frequency of pendulum can also be regulated so as to avoid harmful resonance.

Furthermore, with the present invention, it is possible to incorporate one or more dampers in the pendulum, so as to suppress the undesirable vibrations.

BRIEF DESCRIPTION OF THE DRAWING

For a better understanding of the invention, reference is made to the accompanying drawing, in which.

Like parts are designated by like numerals and symbols throughout the different figures of the drawing.

DESCRIPTION OF THE PREFERRED EMBODIMENTS

Figure 1A:
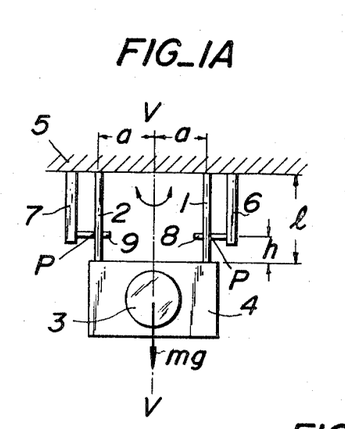
FIGS. 1A and 1B are a schematic front view and a schematic side view of a pendulum of a metering device, according to the present invention, respectively.
Figure 1B:
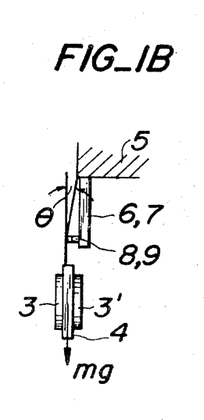

Referring to FIGS. 1A and 1B, a suspending means consisting of a pair of plastics ribbons 1 and 2, each having an effective length $l$, suspends a pendulum mass member 4 from a stationary support member 5, e.g., the casing of a metering device. The pendulum mass member 4 carries reflective mirrors 3, 3'. Arms 6, 7 extend downwardly from the support member 5, and projections 8, 9 secured to the lower ends of the arms 6, 7 engage the plastics ribbons 1, 2 at intermediate positions between the support member 5 and the pendulum mass member 4, so as to form intermediate holding points P. In this case, the upper portions of the plastics ribbons 1, 2 are deviated from a vertical by a small angle $\theta$, as shown in FIG. 1B. The angle $\theta$ is preferably less than 10 minutes.

In FIGS. 1A and 1B, the mass member 4 is suspended by two ribbons 1 and 2, but it is also possible to hang the mass member 4 with one ribbon or three or more ribbons. Furthermore, the material of a means for suspending the mass member 4 is not restricted to plastics, and steel wire or any other suitable flexible suspending means can be used for the purpose.

The friction at the intermediate holding points P between the projections 8, 9 and the plastics ribbons 1, 2 is so small that, the load to ribbons 1 and 2 are evenly distributed throughout the entire length $l$ of the ribbons. As a result, the ribbons 1 and 2 are evenly elongated upon loading, and the stress due to the load can be kept within the elastic region of the ribbons.

The period $T_1$ of the natural twisting vibration of the pendulum of FIGS. 1A and 1B around the vertical V—V of the figures, as shown by the arrow of FIG. 1A, can be given by the following equation (2), as well known to those skilled in the art.

$$T_1 = 2\pi \sqrt{I_1 h/mga^2} \qquad (2)$$

where, $I_1$: moment of inertia of the pendulum mass member 4 about the vertical V—V;

$h$: distance between the line through the intermediate holding points P, P and the upper edge of the pendulum mass member 4;

$2a$: spacing between the two plastics ribbons 1 and 2, the vertical V—V being assumed to pass through center of gravity G of the mass 4 and equally bisect the spacing between the two ribbons 1 and 2;

$m$: mass of the pendulum mass member 4; and $g$: gravitational attraction.

In deriving the equation (2), it is assumed that the rigidity of the ribbons 1 and 2 is negligible.

With the present invention, the magnitude of the aforesaid distance $h$ is made shorter than the effective length $l$ of the ribbons 1 and 2. On the other hand, with a conventional pendulum, the distance $h$ coincides with the effective length $l$ of the ribbons, i.e., $h = l$. In order to have a large natural frequency with a short period $T_1$ of the natural twisting vibration, as defined in the equation (2), it has been practised to use a large spacing $2a$ between the two ribbons. When the adjustment of the spacing $2a$ alone is not sufficient, the distance $h$ is shortened. With a conventional pendulum, to shorten the distance $h$, the effective length $l$ of the ribbons 1 and 2 must be shortened too. As the length $l$ of the ribbons 1 and 2 is reduced, the elongation of the ribbons in response to the loading thereof by the pendulum mass member 4 increases, as far as the elongation per unit length of the ribbons is concerned. Accordingly, when the distance $h$ is made too short in conventional pendulum, the elongation or stress of the ribbons per unit length thereof may exceed their elastic region, so that the accuracy and reliability of the pendulum may be deteriorated.

In short, with the conventional pendulum structure, it has been difficult to achieve a short period $T_1$ of the natural twisting vibration of the pendulum. When the frequency of the natural twisting vibration of the pendulum is too low, an operator has to wait for a long time to get a stable reading.

For instance, with a conventional pendulum structure having the following dimensions and weight, the period $T_1$ of the natural twisting vibration becomes $T_1 = 0.168$ second.

$2a = 6.28$ cm
$I_1 = 350$ gr·cm$^2$
$m = 100$ gr
$h = 2$ cm

This period $T_1$ corresponds to a frequency of about 6 Hz, which falls in an undesirable frequency range of 3 Hz to 8 Hz of the pendulum. More particularly, the natural vibration at such frequency easily resonates with an outside vibration, so that the pendulum tends to swing over a large amplitude.

As a result, the indication of a metering device with such pendulum becomes unstable and difficult to use.

On the other hand, with the present invention, one or more intermediate holding points P are provided between the upper end and the lower end of the plastics ribbons 1 and 2, so as to shorten the aforesaid distance $h$ while bearing the load of the pendulum mass member 4 with the entire length $l$ of the ribbons 1 and 2. For instance, the distance $h$ can be shortened to 0.2 cm in the structure of FIGS. 1A and 1B with the aforesaid typical dimensions. Accordingly, the period $T_1$ of the natural twisting vibration can be reduced to $T = 0.054$ second, which corresponds to a natural frequency of about 18.5 Hz for the pendulum. Since the afterimage effect of human eyes takes place for a vibration having a period of one thirtieth to one tenth of a second, the aforesaid reduced period $T = 0.054$ second, or about one-twentieth of a second, causes the afterimage effect, and an operator of the meter equipped with such pendulum cannot notice the vibration. Thus, the metering is not disturbed by the resonance of the pendulum at the natural twisting frequency thereof.

As regards the mechanical loading to the plastics ribbons 1 and 2, let it be assumed that weight $W$ of the pendulum mass member 4 is 100 gr, effective length $l$ of each ribbon 1 or 2 is 20 mm,
elastic region $K$ of the ribbon 1 or 2 is 1 percent,
yielding stress $E_y$ of the ribbon 1 or 2 is 4.5 Kg/mm$^2$, total sectional area A of the ribbons 1 and 2 is 2 × 2(width) × 0.012(thickness) = 0.048 mm$^2$, and maximum allowable elongation $\lambda_m$ of the ribbons 1 and 2 is 20 × 0.01 = 0.2 mm.

When the pendulum is at a free stationary position, the loading to the ribbons 1 and 2 caused by the pendulum mass member 4 is about 2 Kg/mm$^2$ (= W/A = 100/0.048), which is less than one-half of the yielding stress $E_y$ of the ribbons. When the full length $l$ of the ribbons is used for suspending the pendulum mass member 4, the elongation of the ribbons was proved to be within the maximum allowable elongation $\lambda_m$. On the other hand, if the weight of the pendulum mass member 4 should be borne solely by the distance $h$ portion of the ribbons, the elongation of the ribbons would exceed the aforesaid elastic region K.

Figure 2:
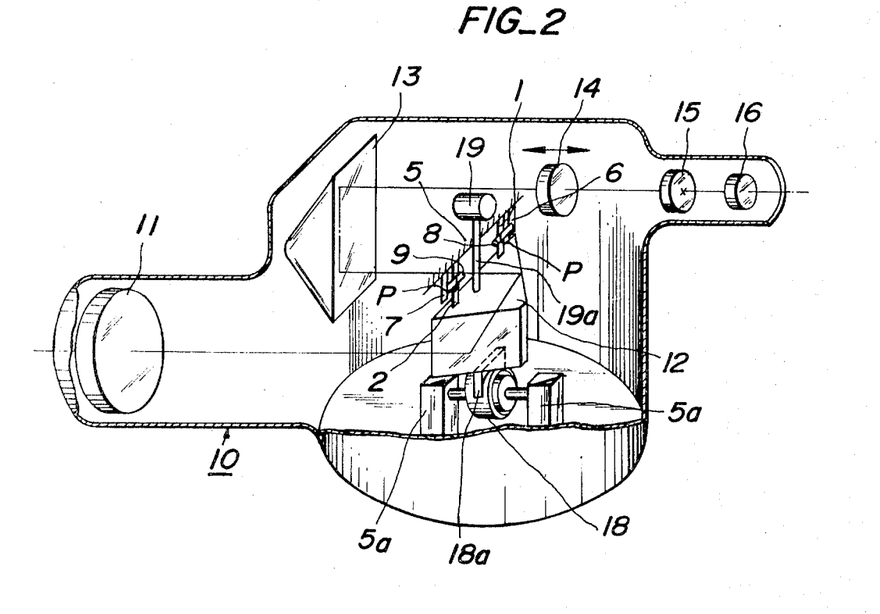
FIG. 2 is a schematic perspective view of an automatic level indicating device including a pendulum according to the present invention.

FIG. 2 illustrates an automatic level indicating device including a pendulum according to the present invention. The automatic level indicating device, as shown in the figure, comprises a casing 10, which carries an objective lens 11, a pendulum prism 12 acting as a pendulum mass member being suspended from a support portion 5 of the casing by ribbons 1 and 2, a focussing lens 14, a reticle 15, and an eyepiece 16. The operative principles of the automatic level indicating device of the figure is described in detail in Japanese Patent Publications Nos. 30,338/1964 and 78/1966, so that it will be described here only to the extent necessary for understanding the present invention. In FIG. 2, a pneumatic damper 18 is connected to the lower end of the pendulum prism 12 through a bracket 18a and a balancing mass member 19 is connected to the top surface of the prism 12 through an arm 19a. Such damper and the balancing weight member are effective in stabilizing the operation of the automatic level indicating device, but neither of them is essential to the present invention.

Figure 3A:
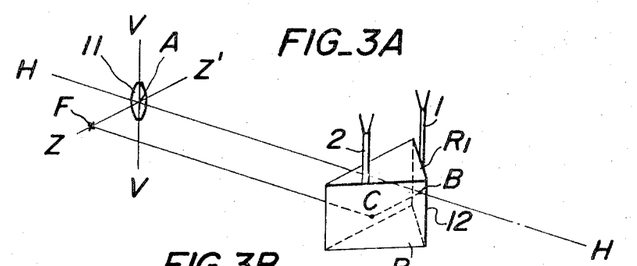
FIGS. 3A, 3B and FIGS. 4A, 4B are schematic diagrams of an optical system of the automatic level indicating device of FIG. 2.
Figure 3B:
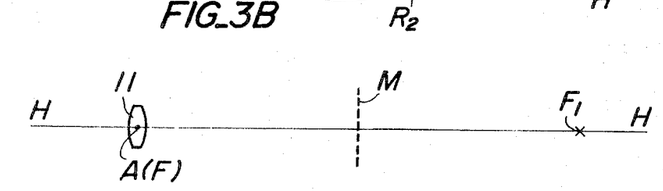

FIG. 3A schematically shows the optical system of the level indicating device in a highly simplified form. A horizontal light beam coming to the prism 12 through a center A of the objective lens 11 along a horizontal $\overline{HH}$ is reflected by a mirror surface R1 of the prism 12 at a point B, and it is reflected again by another mirror surface R2 of the prism at a point C and proceeds to focus F of the lens 11. The two mirror surfaces R1 and R2 must be formed at right angles with each other. When the prism 12 is placed at the middle point of the focal length of the lens 11, the focus F and the center A of the lens 11 are aligned with a line $\overline{zz'}$ which is perpendicular to a horizontal $\overline{HH}$, as shown in FIG. 3B. Referring to FIG. 3B, if there should not be the prism 12, the horizontal incident light beam to the lens 11 through its center A is focussed at a focal point F' of the lens 11. If an imaginary mirror M is placed at the middle point between the points A and F', the aforesaid horizontal incident light beam will be focussed at the center A of the lens 11, as apparent to those skilled in the art. The prism 12 performs the function of the imaginary mirror M plus offsetting the focal point away from the center A of the lens 11 along the aforesaid line $\overline{zz'}$, as shown in FIG. 3A.

Let it be assumed now that the casing 10 of the automatic level indicating device of FIG. 2 is tilted away from the horizontal $\overline{HH}$ by an angle $\alpha$. Then, the objective lens 11 is tilted by the same angle $\alpha$ relative to the horizontal $\overline{HH}$, as shown in FIG. 4B. If there should not be the prism 12, the focal point of the lens 11 would be shifted from the position $F_1$ to another position $F_2$ by such tilting of the lens 11, as shown in FIG. 4B. In the arrangement of FIG. 4B, if another imaginary mirror $M_i$ is placed at the middle point of the points A and $F_1$ with an angle $\alpha$ relative to the horizontal $\overline{HH}$, the horizontal incident light beam through the center A of the lens 11 will be focussed at the focal point $F_2$ despite the tilting of the lens 11, as illustrated in FIG. 4B. The pendulum prism 12 performs the function of such imaginary mirror $M_i$. More particularly, if a mirror M' is held vertically at middle point between the points A and $F_1$ regardless of the angular position of the objective lens 11, as shown in FIG. 4B, the horizontal incident light beam through the center A of the lens 11 is always focussed at the point F which is aligned with the center A along the aforesaid line $\overline{zz'}$, as shown in FIG. 4A.

Figure 4A:
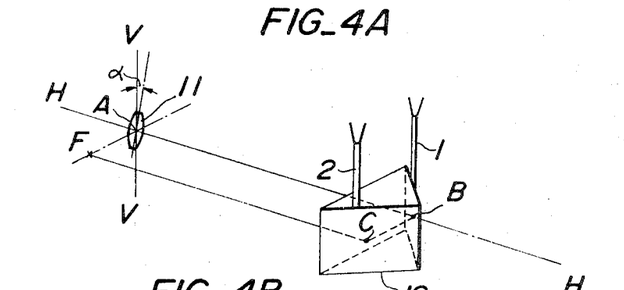
Figure 4B:
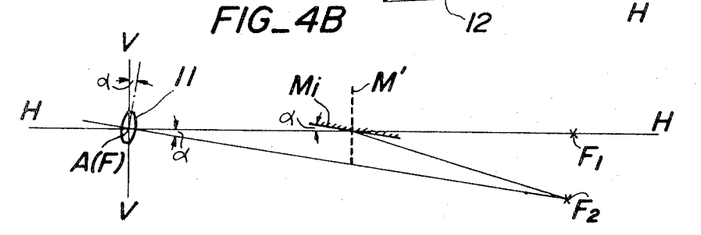

The reticle 15 of FIG. 2 is located at a point corresponding to the focal point F of FIG. 4A, so that with the automatic level indicating device of FIG. 2, the horizontal $\overline{HH}$ can be collimated even when the casing 10 is tilted away from the horizontal.

In the arrangement of FIG. 2, an additional prism 13 is used to place the point F of FIG. 4B to that end of the casing 10 which is opposite to the objective lens 11. The prism 13 also acts to produce an erect image at the reticle 15.

According to the present invention, two arms 6 and 7 are secured to the support portion 5 of the casing 10. The arms carry projections 8 and 9 which come in contact with the plastic ribbons 1 and 2. The contact points between the plastic ribbons 1, 2 and the projections of the arms 6 and 7 form the aforesaid intermediate holding points P. Whereby, the period $T_1$ of the natural twisting vibration of the pendulum prism 12 is shortened so as to stabilize the operation of the level indicating device.

The mirror surface R1 and R2 of the pendulum prism 12 may be considered as what correspond to the mirror 3 carried by the mass member 4 of FIGS. 1A and 1B.

It should be noted here that the suspending means for the pendulum prism 12 or the pendulum mass member 4 is not restricted to the plastic ribbons 1 and 2. According to the present invention, any flexible suspending means which can hold the mirrors 3, 3' or the mirror surfaces R1 and R2 vertical, regardless of the posture of the support member 5, can be used.

Figure 5A:
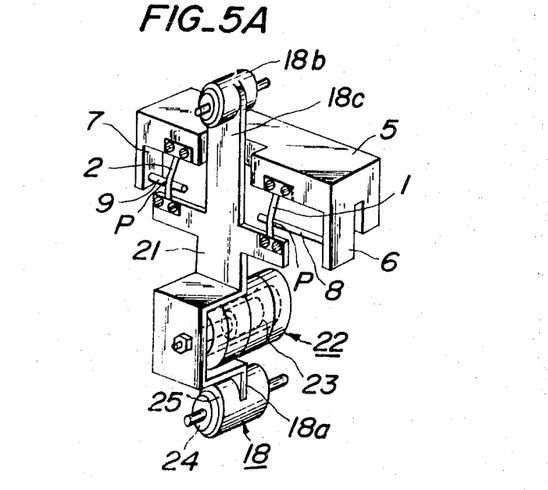
FIGS. 5A and 5B are a perspective view and a sectional view of an electric level indicating device which includes a pendulum according to the present invention, respectively.
Figure 5B:
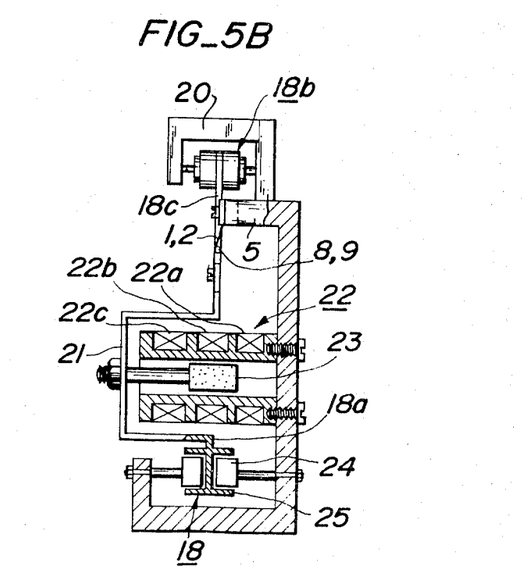

FIGS. 5A and 5B illustrate an electric level indicating device, based on the pendulum means, according to the present invention. In the figures, a framework 20 of the level indicating device has a support portion 5 which includes two arms 6 and 7. A pendulum frame 21 is suspended from the support portion 5 of the framework 20 by a pair of plastic ribbons 1 and 2. The arms 6 and 7 carry projections 8 and 9, respectively. The projections 8 and 9 engage the ribbons 1 and 2 so as to form intermediate holding points P, as shown in the figures. The pendulum frame 21 carries a dust core 23 which cooperates with a differential transformer 22 secured to the framework 20. The dust core 23 fits in a hollow space of the differential transformer 22 with a suitable spacing therefrom. The relative position between the core 23 and the transformer 22 varies depending on the magnitude of deviation of the framework 20 with the transformer 22 from a vertical, because the pendulum frame 21 carrying the core 23 swings relative to the framework 20 as the latter swings away from a vertical.

A pneumatic damper 18, which consists of a piston 24 and a cylinder 25, is connected to the lower end of the pendulum frame 21 through an arm 18a. Another pneumatic damper 18b is connected to the top end of the pendulum frame 21 through an arm 18c. The dampers 18 and 18b are, however, not essential to the present invention.

The differential transformer 22 has windings 22a, 22b, and 22c, which are connected to a power source (not shown) and an electric metering circuit (not shown) in a manner known to those skilled in the art. As the position of the framework 20 deviates from a vertical, or a horizontal, the position of the dust core 23 relative to the differential transformer 22 varies, so that the windings act to produce an output signal which represents such movement of the core 23 relative to the transformer 23 in a manner known to those skilled in the art. By detecting the magnitude of such output signal, the deviation of the framework 20 from a vertical or horizontal can be determined. A bridge circuit (not shown) and an amplifier (not shown) may be used for facilitating the detection of the magnitude of the output signal from the differential transformer.

The provision of the intermediate holding points P in the electric level indicating device of FIGS. 5A and 5B apparently shortens period $T_1$ of natural twisting vibration of the pendulum frame 21 by reducing the distance $h$ as defined by referring to the equation (2).

Figure 6:
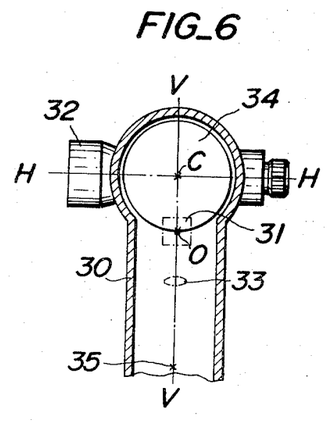
FIGS. 6 to 8 are sectional views of a theodolite using a pendulum according to the present invention.
Figure 7:
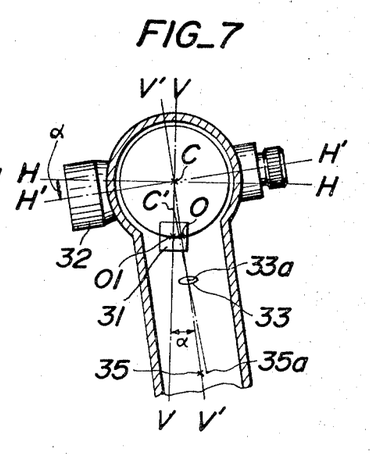
Figure 8:
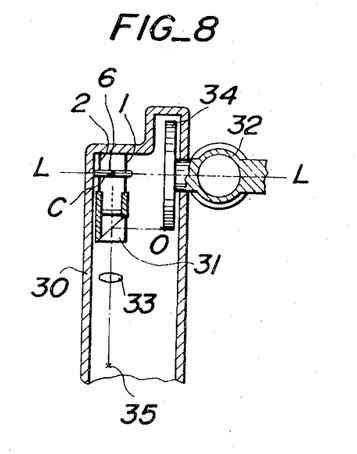

FIGS. 6 to 8 illustrate a theodolite including pendulum, according to the present invention. The principle of the theodolite of the figures is disclosed in detail in Japanese Patent Publication No. 7,673/1968, so that it will be described here only to the extent necessary for the understanding of the present invention.

Referring to FIGS. 6, 7, and 8, a post 30 of the theodolite rotatably carries a telescope 32, and a scale disk 34 which is integrally secured to the telescope 32 so as to rotate therewith. A prism 31 is suspended from the post 30 by plastics ribbons 1 and 2, and the post 30 carries an objective lens 33. When the post 3o is vertical and the optical axis of the telescope 32 is aligned with a horizontal line $\overline{HH}$, the prism 31 and the lens 33 act to project the image of a graduation 0 of the scale disk 34 on an index 35 which is fixed to the post 30. An enlarging glass or a microscope (not shown) may be used for detecting the coincidence of the image of the graduation 0 with the index 35, which coincidence indicates that the optical axis of the telescope 32 is in line with the horizontal $\overline{HH}$, as shown in FIG. 6.

Let it be assumed that the post 30 is inclined from the position of FIG. 6 by an angle $\alpha$, as shown in FIG. 7. If the prism 31 were assumed to be integrally connected to the post 30, the image of the graduation 0 of the scale disk 34 would be projected on the index 35 even after the optical axis of the telescope 32 moved to a non-horizontal position $\overline{H'H'}$ of FIG. 7, so as to cause an error of angle $\alpha$ in the measurement of an angle of elevation by the theodolite. The suspended prism 31, as shown in FIGS. 6 to 8, is to automatically compensate for such an error.

More particularly, the prism 31 of the theodolite is suspended by the ribbons 1 and 2 and an arm 6 so as to assume a constant position relative to a vertical V—V regardless of the angular position of the post 30, while producing a virtual image of graduations of the scale disk 34 at a point C which is on an axis of rotation L—L of the telescope 32. The scale disk 34 is secured to the telescope 32 in such a manner that the center of the disk 34 is on the axis of rotation L—L of the telescope. Since the lens 33 and the index 35 are fixed to the post 30, the position of the aforesaid point C relative to the lens 33 and the index 35 is constant independently of the angular position of the post 30 relative to a vertical V—V. Whereby, a virtual image at the point C is always projected on the index 35.

Accordingly, when the post 30 is vertical and the telescope 32 is horizontal, as shown in FIG. 6, the graduation 0 of the scale disk 34 which is on a vertical plane V—V passing the point C is projected to the point C as a virtual image by the prism 31, and the lens 33 produces a real image of such virtual image on the index 35. On the other hand, if the post 30 is swayed from the vertical V—V by an angle $\alpha$, as shown in FIG. 7, a virtual image of a graduation $0_1$, which is on a vertical plane through the point C at the time, is projected on the point C, because the prism 31 is so suspended as to swing about the arm 6 aligned with the point C. Thus, in this case, a real image of the graduation $0_1$ is projected on the index 5 by the lens 33. Thus, the reading at the index 35 in this case is deviated from the aforesaid original graduation 0 by an angle $\alpha$. Such reading coincides with the angle between the actual position H'H' of the telescope optical axis from the horizontal HH. Therefore, the reading at the index 35 provides for a compensation of the inclination of the post 30.

In the device of FIGS. 6 to 8, it is essential to allow the prism 31 to swing about the axis of rotation L—L of the telescope 32 which is aligned with the center of the scale disk 34, because if the former is not aligned with the latter, the real image of the graduation of the disk 34 is produced at a point 35a that is offset from the normal position of the index 35, as shown in FIG. 7. The deviation of the point 35a from the index 35 causes an error.

With the aforesaid structure of the present invention, it is possible to use long ribbons 1 and 2 while ensuring the stable operation of the theodolite. The long ribbons can prevent the overloading of the ribbons by the weight of the prism 31. Furthermore, with the structure of the present invention, the distance between the arm 6 and supporting means of the prism 31 can be minimized, so that undesirable twisting vibration frequencies of the prism 31 relative to the arm 6 and the post 30 can easily be eliminated. From the manufacturing standpoint, the accuracy required for the positions at which the ribbons 1 and 2 are secured to the post 30 is reduced, because the performance characteristics of the prism 31 is determined not by the securing positions but by the arm 6.

Figure 9:
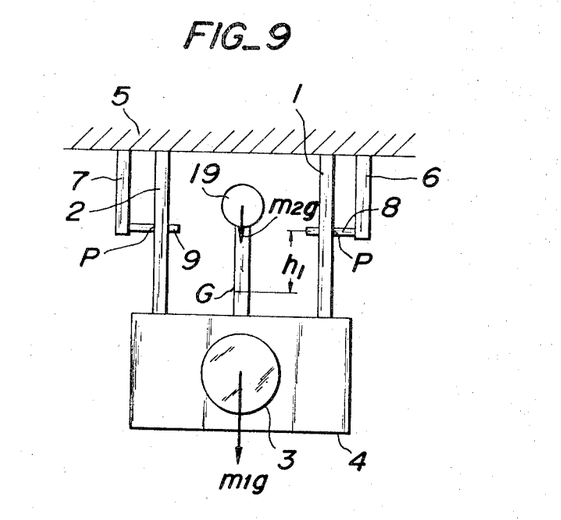
FIG. 9 is a schematic diagram of an embodiment of the present invention, which uses a pendulum including a weight member.

As shown in FIG. 2, according to the present invention, it is possible to mount a balancing weight member 19 to the top end of the pendulum mass member 4. The effect of such balancing weight member will now be described. Referring to FIG. 9, if the mass of the pendulum mass member 4 and the mass of the balancing weight member 19 are represented by $m_1$ and $m_2$, respectively, and if the vertical distance between a center of gravity G of the assembly of the members 4 and 19 and a line P—P connecting the intermediate holding points of the pendulum is represented by $h_1$, the period $T_2$ of the natural swinging vibration of the pendulum about the aforesaid line P—P, which is the axis of the swing vibration, is given by the following equation (3).

$$T_2 = 2\pi \sqrt{I_2/(m_1 + m_2)gh_1}$$

(3)

Here, $I_2$ is the moment of inertia of the assembly of the members 4 and 19 about the line P—P. In deriving the equation (3), it is assumed that the rigidity of the ribbons 1 and 2 is negligible.

With the arrangement of FIG. 9, if the mass $m_2$ is increased relative to the mass $m_1$, or if the ratio $m_2/m_1$ is increased, the vertical position of the center of gravity G is raised, so that the aforesaid distance $h_1$ is reduced. Accordingly, the period $T_2$ of the natural swinging vibration of the pendulum is increased for further stabilizing the measurement by such pendulum. It should be noted that the center of gravity G is always placed below the position of the axis of swinging vibration P—P of the pendulum, because if the former point G is above the latter axis P—P, the pendulum becomes unstable.

Theodolite, as shown in FIGS. 6 to 8, does not include such balancing weight member, but it is apparent to those skilled in the art that such a weight member 19 can be mounted to the prism 31. Similarly, the upper damper 18b of the electric pendulum of FIGS. 5A and 5B may be replaced with such a balancing weight member 19.

Figure 10:
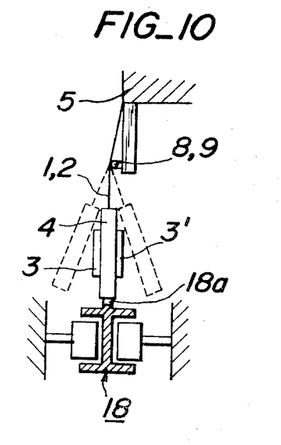
FIGS. 10 to 12 are diagrammatic illustrations of a pendulum according to the present invention, which includes dampers.

The effect of the damper 18, as shown in FIG. 2 and FIGS. 5A and 5B, will now be described. Referring to FIG. 10, if the lower end of a pendulum mass member 4 carrying mirrors 3 and 3' is left free, the member 4 tends to continue its swinging about an axis P at its natural frequency, as apparent from the foregoing description. Such swinging is shown by dotted lines of the figure. The damper 18 is effective in suppressing such swinging. In FIG. 5B, such damper 18 consists of a cylinder 25 connected to the lower end of the pendulum frame 21 through a connecting arm 18a. The frame 21 of the electric pendulum of FIG. 5A corresponds to the pendulum mass member 4 of FIG. 10. Pistons 24, which are adapted to fit in hollow spaces of the cylinder 25, are secured to the framework 20, in such a manner that, as the pendulum frame 21 swings, the pneumatic friction between the pistons 24 and the cylinder 25 acts to damp the swinging of the frame 21. Although a pneumatic damper is illustrated, it is also possible use any other suitable dampers in the pendulum, according to the present invention. For instance, the pendulum itself may be placed in a viscous damping fluid, or an electric damper based on the eddy current phenomenon may be used instead of the pneumatic damper.

In the embodiment of FIG. 2, pistons of the pneumatic damper 18 are secured to support portions 5a which are integral with the casing 10. As apparent to those skilled in the art, a suitable damper may be connected to the lower end of the prism 31 of the theodolite of FIGS. 6 to 8.

Figure 11:
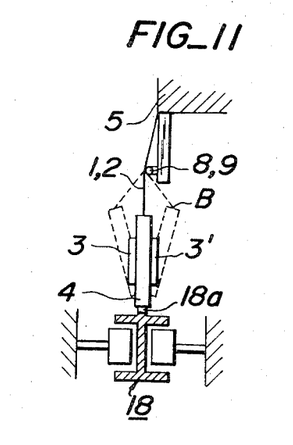
Figure 12:
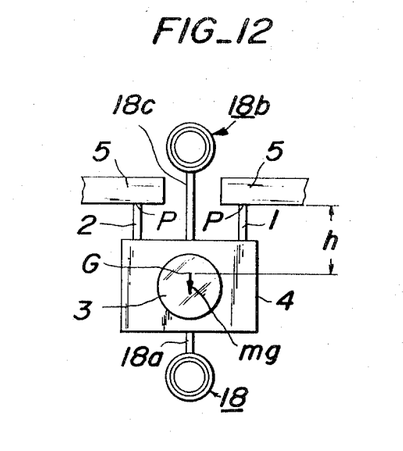

Referring to FIG. 11, when the pneumatic damper 18 is connected to the lower end of the pendulum mass member 4, the top end of the member 4 tends to swing back and forth, as shown by dotted lines of the figure. To suppress such swinging of the top end of the member 4, another pneumatic or other suitable damper 18b may be connected to the top end of the member 4, as shown in FIG. 12. In the electric pendulum of FIG. 5B, an upper damper 18b is provided, which consists of a cylinder connected to the pendulum frame 21 through an arm 18c and pistons secured to the framework 20 of the pendulum. The balancing weight member 19 of the automatic level indicating device of FIG. 2 may be replaced with a suitable upper damper. Similarly, the prism 31 of the theodolite of FIGS. 6 to 8 may also be provided with a suitable upper damper.

As described in the foregoing disclosure, according to the present invention, there is provided a metering device using a pendulum for determining gravitational reference direction, such as an automatic level indicating device, an electric pendulum, or a theodolite. The pendulum in the metering device of the present invention is very simple in construction yet it is difficult to resonate with the outside vibration, so that its visual field is fairly stable. Furthermore, with the present invention, such advantage can be achieved without reducing the length of a suspending means, such as plastic ribbons, so that high mechanical strength of the suspending means can be ensured.

Although the present invention has been described by way of example, it is apparent to those skilled in the art that numerous changes and modifications are possible in the illustrated embodiments without departing from the scope of the invention as claimed hereinafter.

What is claimed is:

1. A metering device using a pendulum for determining gravitational reference direction, comprising a casing, an objective lens carried by said casing, a pendulum mass carrying a vertical-indicating element, a flexible hanging means having an upper end thereof secured to said casing and a lower end thereof secured to said pendulum mass, and an arm secured to said casing, said arm contacting said flexible hanging means at an intermediate point between said upper and lower ends of the hanging means and defining an intermediate holding point without causing any permanent deformation of the hanging means, said pendulum mass being rotatable about said intermediate holding point.

2. A metering device according to claim 1 and further comprising a damper connected to lower end of said pendulum mass.

3. A metering device according to claim 1 and further comprising a balancing weight member secured to upper end of said pendulum mass.

4. A metering device according to claim 1, wherein said vertical-indicating element is a mirror.

5. A metering device according to claim 1, wherein the objective lens defines an optical axis, said pendulum mass being a prism having two mirror surfaces which are disposed at right angles with each other and located at a point halfway between said objective lens and the focal point of the lens, the hypotenuse of the prism intersecting said axis at right angles.

6. A metering device according to claim 1 and further including a differential transformer composed of windings secured to the casing and connected to a power source and an electric metering circuit, respectfully, and an electromagnetic core secure to said pendulum mass, whereby said differential transformer produces an output signal representing position of said mass relative to the differential transformer.

7. A metering device according to claim 1, wherein said hanging means consists of a pair of plastic ribbons.

8. A metering device according to claim 2 and further comprising a second damper connected to top end of the pendulum mass.

9. A metering device according to claim 2, wherein said damper is a pneumatic damper having a piston secured to the metering device and a cooperating cylinder secured to said pendulum mass.

10. A metering device according to claim 2 and further comprising a balancing weight member secured to top end of said pendulum mass.

* * * * *